(12) United States Patent
Soroushian

(10) Patent No.: US 6,664,702 B2
(45) Date of Patent: Dec. 16, 2003

(54) PSEUDOELASTIC SPRINGS WITH CONCENTRATED DEFORMATIONS AND APPLICATIONS THEREOF

(75) Inventor: Parviz Soroushian, Lansing, MI (US)

(73) Assignee: DPD, Inc., Lansing, MI (US)

( * ) Notice: Subject to any disclaimer, the term of this patent is extended or adjusted under 35 U.S.C. 154(b) by 0 days.

(21) Appl. No.: 09/733,690

(22) Filed: Dec. 11, 2000

(65) Prior Publication Data

US 2003/0034711 A1 Feb. 20, 2003

(51) Int. Cl.$^7$ ................................................ H02K 13/10
(52) U.S. Cl. ........................ 310/246; 267/160; 267/164; 310/239; 310/245
(58) Field of Search ................................. 310/239, 242, 310/244, 245, 246, 306, 307; 267/136, 164, 158–160; 188/378–380

(56) References Cited

U.S. PATENT DOCUMENTS

| | | | |
|---|---|---|---|
| 4,389,588 A | 6/1983 | Rankin | 310/242 |
| 4,846,729 A | 7/1989 | Hikami et al. | 439/161 |
| 4,848,388 A | 7/1989 | Waldbusser | 137/80 |
| 4,901,969 A * | 2/1990 | Yaeger | 248/455 |
| 4,952,162 A | 8/1990 | Hikami et al. | 439/161 |
| 5,014,520 A | 5/1991 | Orner et al. | 62/187 |
| 5,035,530 A * | 7/1991 | Fukuda et al. | 403/404 |
| 5,059,133 A | 10/1991 | Hikami et al. | 439/161 |
| 5,083,439 A | 1/1992 | Orner et al. | 621/187 |
| 5,217,382 A | 6/1993 | Sparks | 439/161 |
| 5,463,264 A | 10/1995 | Koenitzer | 310/242 |
| 5,776,162 A * | 7/1998 | Kleshinski | 606/198 |
| 5,907,207 A | 5/1999 | Peot et al. | 310/245 |
| 6,116,915 A * | 9/2000 | McDaniel et al. | 439/65 |
| 6,165,292 A * | 12/2000 | Abrams et al. | 148/563 |
| 6,371,463 B1 * | 4/2002 | Sorovshian | 267/158 |

FOREIGN PATENT DOCUMENTS

| | | |
|---|---|---|
| JP | 58217834 A2 | 11/1983 |
| JP | 60009864 A2 | 1/1985 |
| JP | 60070153 A2 | 4/1986 |
| JP | 61084361 A2 | 4/1986 |
| JP | 62-296746 * | 12/1987 |
| JP | 4076274 A2 | 3/1992 |
| JP | 6109049 A2 | 4/1994 |
| JP | 7062505 A2 | 3/1995 |
| JP | 7062506 A2 | 3/1995 |
| WO | WO 9841962 A2 | 9/1998 |

* cited by examiner

Primary Examiner—Nestor Ramirez
Assistant Examiner—Judson H. Jones

(57) ABSTRACT

Pseudoelastic elements are shaped in order to form springs which exhibit relatively constant force levels over a major fraction of maximum deflection capacity during loading and also during unloading. The shape of sail pseudoelastic elements is chosen to concentrate at least one of flexural and torsional deformations within limited regions. The element may be braced outside said regions in order to further concentrate deformations within said regions. Loading of said pseudoelastic springs thus produces strains within said regions which are largely corresponding to the upper pseudoelastic stress plateau where strain variations cause relatively small changes in stress. Unloading of said pseudoelastic springs also produces strains within said regions which are largely corresponding to the lower stress plateau of the pseudoelastic stress-strain curve where stress is subject to relatively small changes with strain variations. Said psueodoelastic springs can be used in brush holders which can benefit from a relatively constant level of force as deflections occur due to brush wear.

6 Claims, 14 Drawing Sheets

Figure 13(a) Side View

Figure 13(b) Top View

PSEUDOELASTIC SPRINGS WITH CONCENTRATED DEFORMATIONS AND APPLICATIONS THEREOF

This invention was made with U.S. government support under N00024-00-C-4122 awarded by the U.S. Navy. The U.S. government has certain rights in the invention.

BACKGROUND OF THE INVENTION

1. Field of the Invention

The invention is generally related to constant-force springs and their applications. Particularly, the invention is directed to making constant-force pseudoelastic (superelastic) springs with pseudoelastic alloys and their applications in brush holders for electric machines.

2. Description of the Relevant Art

Pseudoelastic alloys, when stressed, undergo relatively large strains (up to 10%) which would be recovered upon removal of stress. The recoverable strain of pseudoelastic alloys (up to 10%) is far greater than the recoverable strain of conventional metals (e.g., about 0.3% for steel). A major fraction of pseudoelastic strain occurs under a relatively constant level of stress. Recovery of pseudoelastic strains during stress removal also largely takes place under a relatively constant level of stress. This is unlike elastic strain where during elastic strain occurrence and recovery stress varies in proportion (linearly) with strain. A schematic presentation of the stress-strain relationships for pseudoelastic alloys and elastic materials during loading and unloading is given in FIG. 1.

Pseudoelasticity is exhibited by shape memory alloys within a particular range of temperature. This temperature range can be adjusted to suit particular service conditions of targeted applications through tailoring the composition and processing of alloys. Examples of shape memory alloys exhibiting pseudoelastic behavior include nickel-titanium alloys and copper-based alloys such as Cu—Zn—Al and Cu—Al—Ni.

Shape memory alloys have been used in different spring applications. U.S. Pat. No. 4,846,729 to Hikami et al., U.S. Pat. Nos. 4,952,162 and 5,059,133 to Hikami et al. disclose electronic connectors with a shape memory spring which transmits a recovery force when the shape memory spring reaches or exceeds its transformation temperature. U.S. Pat. No. 4,848,388 to Waldbusser discloses a self actuating valve system where a shape memory spring applies the actuating force when temperature exceeds its transformation temperature (e.g. due to fire). U.S. Pat. Nos. 5,014,520 and 5,083,439 to Omer et al. disclose a control device with a shape memory spring which moves a valve when temperature is raised above its transformation temperature. U.S. Pat. No. 5,217,382 to Sparks discloses en electric receptacle with a shape memory spring which is heated above its transformation temperature in order to cause certain movements caused by its shape recovery. World Intellectual Property Organization No. 9841962A2 to Schleppenbach et al. discloses an apparatus using the actuating effect associated with shape recovery of shape memory springs upon heating above their transformation temperature. Japanese Pat. No. 40766274A2 to Sho et al. discloses a shape memory spring of honeycomb-like geometry which acts as an actuator. Japanese Pat. No. 60070153A2 to Katsuji discloses a shape memory spring of particular geometry which acts as an actuator controlled by temperature change. Japanese Pat. No. 6109049A2 to Kiyoshi discloses a superelastic spring of particular geometry which exhibits shape memory (actuating) effect and excellent durability.

The shape memory springs which are subject of the above inventions are essentially heat-activated actuators. The pseudoelastic spring which is subject of this application is distinguished from the above shape memory springs because it is still a spring (and not a heat-activated actuator) with novel geometry and optional bracing condition, which exhibits a particular force-deformation (i.e., constant-force) behavior.

Japanese Pat. No. 58217834A2 to Akira et al. disclose a superelastic spring subjected to plastic deformation so that a permanent set of more than 10% remains upon unloading. This process yields a (conventional) linear spring which is relatively stable over a wide temperature range. Japanese Pat. No. 60009864A2 to Kazuo et al. discloses a superelastic spring of conventional (linear) behavior with a relatively high (recoverable) deformation capacity. Japanese Pat. No. 61084361A2 to Kiyoshi et al. discloses the manufacturing process of a pseudoelastic spring of high flow stress near the body temperature. Japanese Pat. No. 7062506A2 to Hiroshi discloses production of a superelastic spring of conventional (linear) behavior with high (recoverable) deformation capacity. Japanese Pat. No. 7062505A2 to Hiroshi discloses a superelastic spring of conventional (linear) behavior with excellent fatigue characteristics.

The superelastic (pseudoelastic) springs discussed above all act as conventional (linear) springs with forces varying proportionally with deformations. The pseudoelastic spring disclosed in this invention is distinguished from the above by its novel geometry and optional bracing condition which yield a constant-force behavior where the spring force is relatively constant over large deformations; this deviated from the conventional (linear) behavior of the above superelastic springs where force varies proportionally with deformation.

The constant-force pseudoelastic spring which is subject of this invention can be used in constant-force brush holders for electric machines. Examples of constant-force brush holders which utilize conventional materials (and not pseudoelastic alloys) are disclosed in U.S. Pat. No. 4,389,588 to Rankin, U.S. Pat. No. 5,463,264 to Koenitzer, and U.S. Pat. No. 5,907,207 to Peot et al.

SUMMARY OF THE INVENTION

It is an object of this invention to provide pseudoelastic springs having a constant-force behavior over relatively large deformations.

It is another object of this invention to provide particular geometric configurations in pseudoelastic springs which cause a constant-force behavior.

It is another object of this invention to provide particular bracing conditions of pseudoelastic springs which cause a constant-force behavior.

It is another object of this invention to provide constant-force brush holders which incorporate pseudoelastic springs.

Applicant has developed a novel geometry and optional bracing condition for pseudoelastic springs which undergo relatively large deformations at a relatively constant level of force. Pseudoelastis springs with various versions of such geometric and optional bracing conditions have been manufactured and tested. The results validated the constant-force behavior of such springs.

According to the invention, there is provided springs made of pseudoelastic alloys, with particular geometric and optional bracing conditions which exhibit a constant-force behavior.

DETAILED DESCRIPTION OF THE PREFERRED EMBODIMENTS OF THE INVENTION

Figure 1:
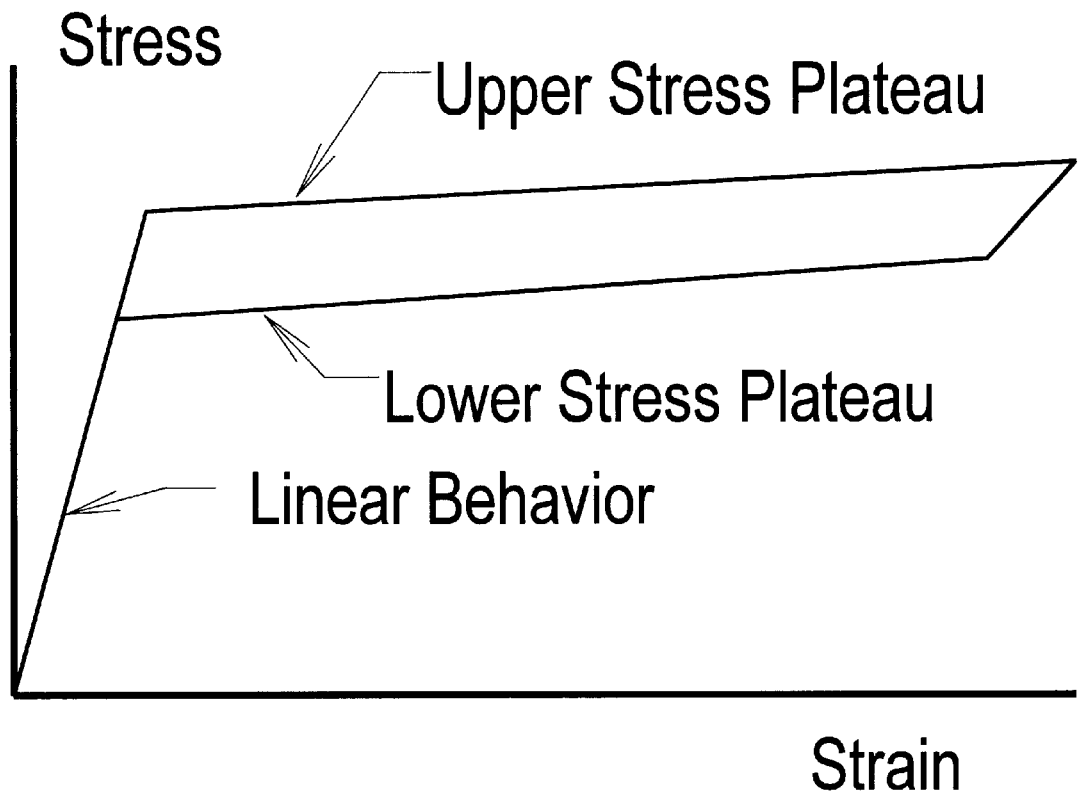
FIG. 1 is a graph showing schematic stress-strain curves for pseudoelastic alloys and conventional elastic materials.
Figure 2:
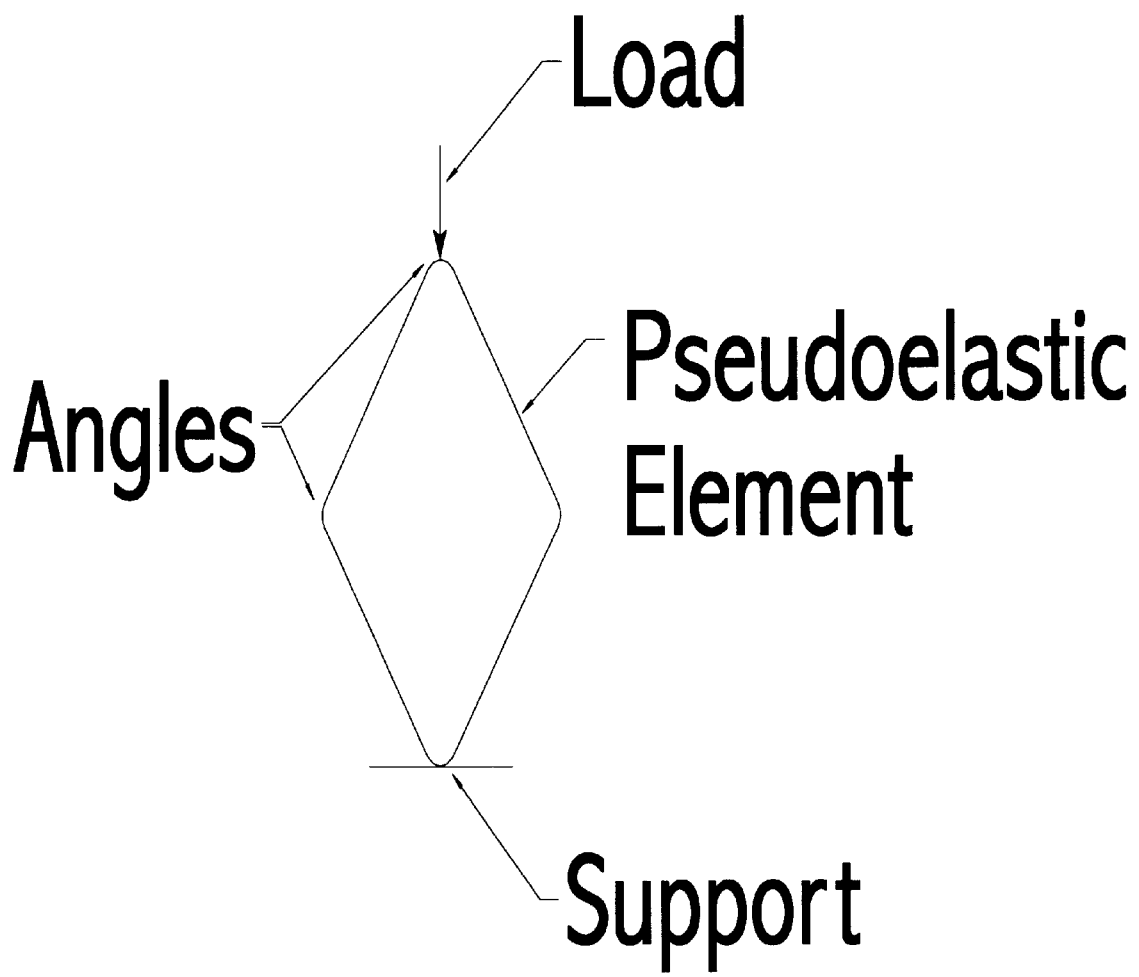
FIG. 2 shows the geometry of an element which tends to undergo concentrated flexural deformations within and near angles under axial loading.
Figure 3:
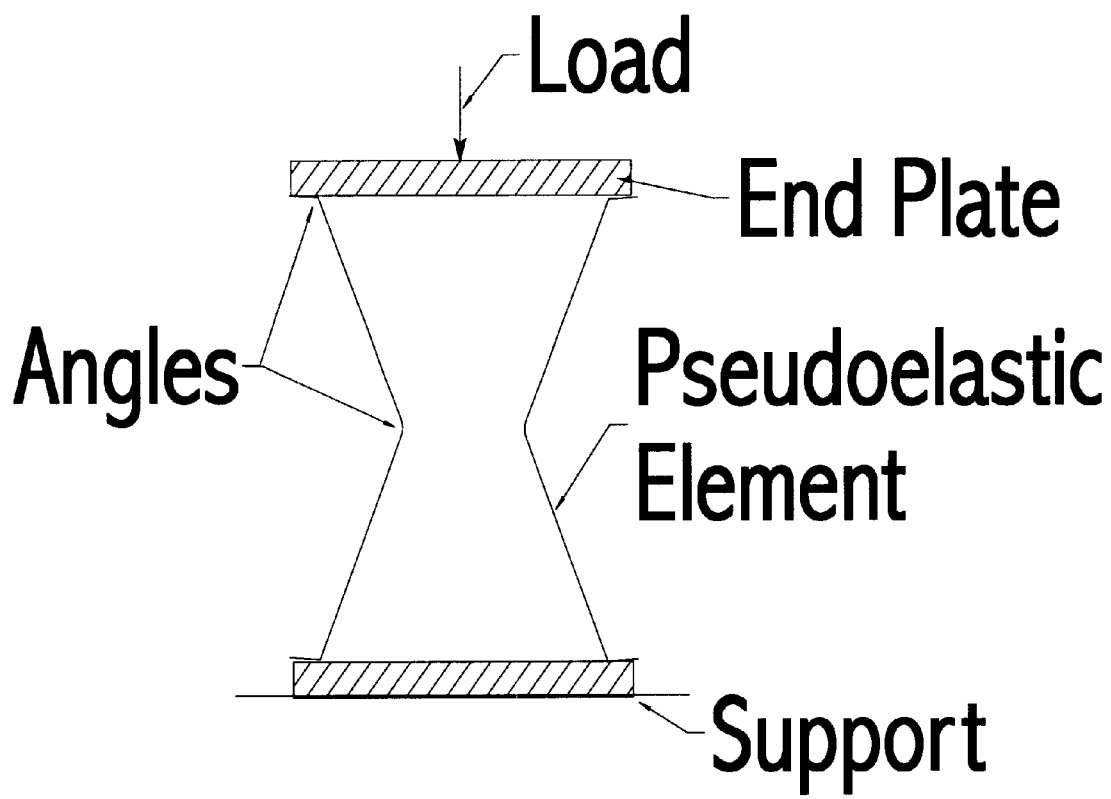
FIG. 3 shows the geometry of an element which tends to undergo concentrated flexural deformations within and near angles under axial loading.
Figure 4:
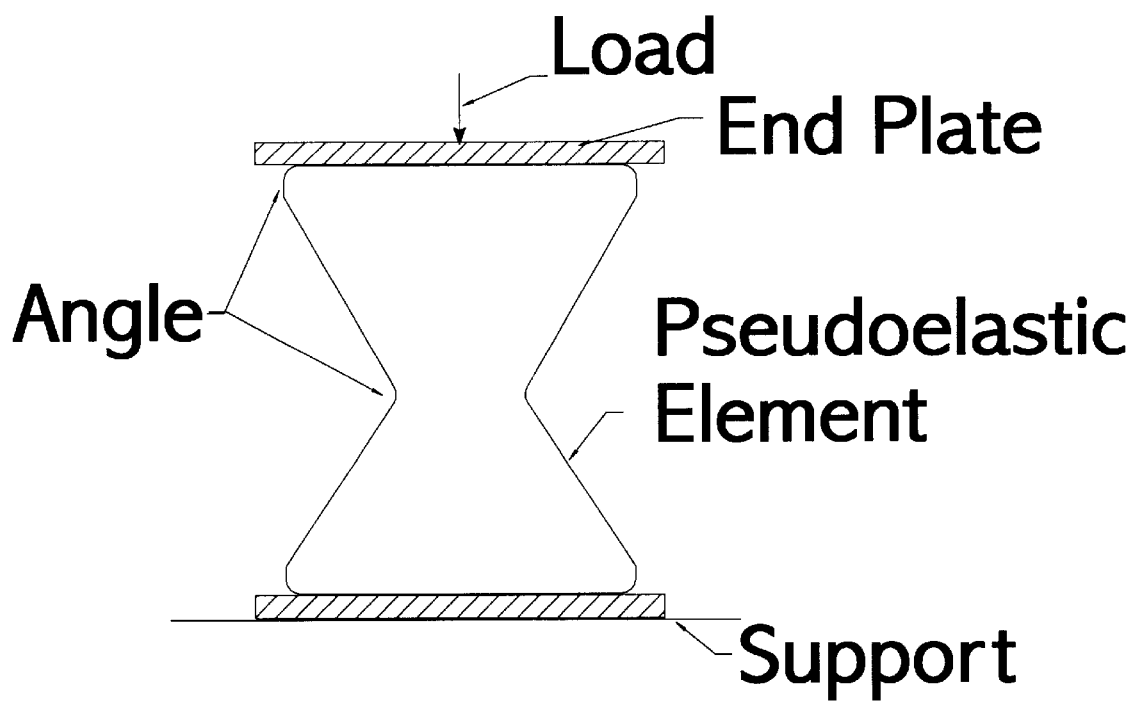
FIG. 4 shows the geometry of an element which tends to undergo concentrated flexural deformations within and near angles under axial loading.
Figure 5:
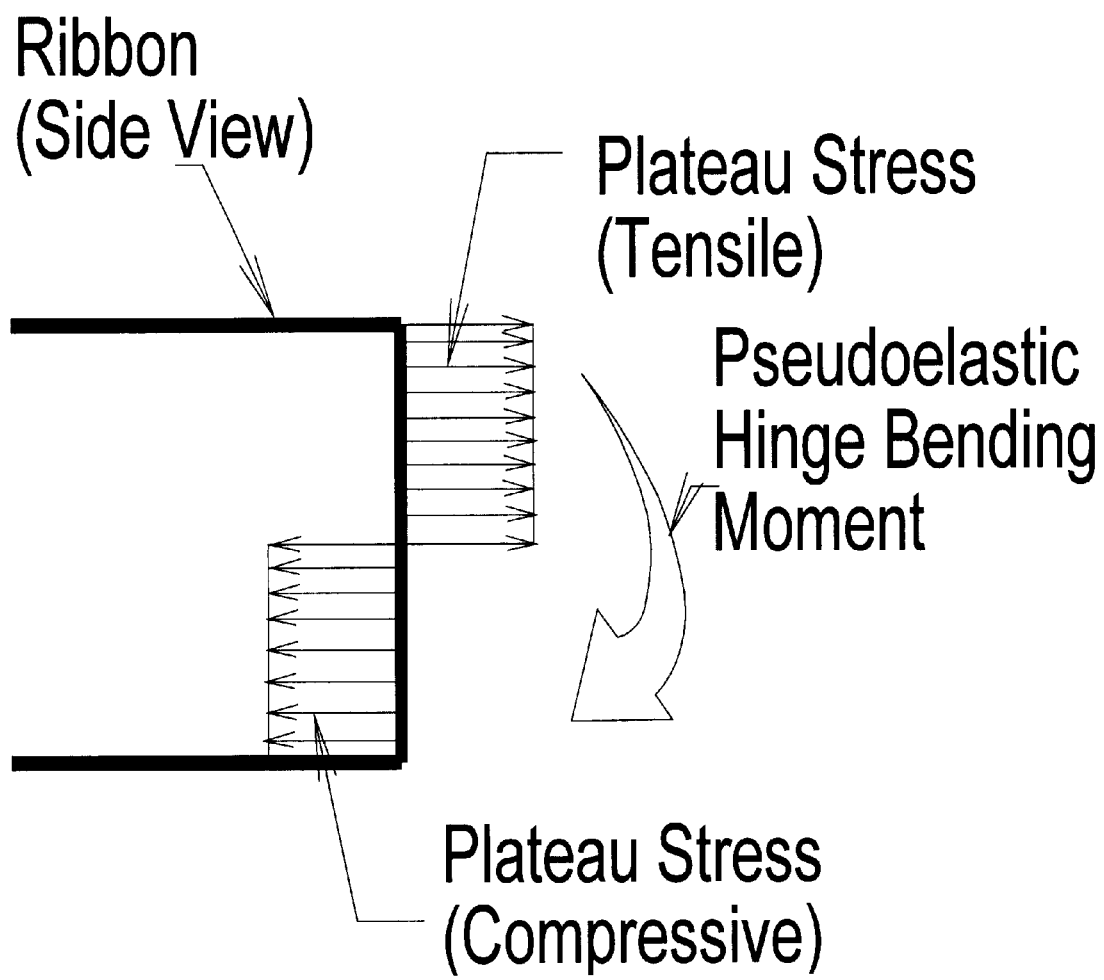
FIG. 5 shows the stress distribution within a psedueoelastic hinge.

The stress-strain curve of pseudoelastic alloys shown in FIG. 1 exhibits an initial linear behavior followed by a stress plateau where stress is relatively constant as strain increases. Upon unloading, stress remains relatively constant initially on a lower plateau and then linear unloading occurs where stress decreases proportionally with strain. Conventional spring geometries are selected to make maximum use of the linear behavior of elastic spring materials. This invention, on the other hand, seeks geometric configurations and optional bracing conditions which yield a spring capable of overcoming linear strains and operating largely on stress plateaus where stress remains relatively constant during loading (on the upper plateau of FIG. 1) and also during unloading (on the lower plateau of FIG. 1). For this purpose, we need to select a geometry which, unlike the conventional spring geometry, concentrates relatively large local strains when the spring is subjected to global deformations. Examples of such geometries shown in FIGS. 2, 3 and 4 all include angles within which flexural deformations concentrate. Global deformations largely occur by concentrated bending of said angles which produces relatively large flexural strains near said angles. Such concentrated bending could cause formation of "plastic hinge" (with a relatively constant bending moment) if the angle was made of conventional elastic-plastic spring materials such as steel. Such plastic deformations are permanent and cannot be recovered upon unloading; therefore, the spring ceases to behave as a spring (i.e., cannot recover its original geometry upon unloading) once it undergoes plastic deformations. When springs of said geometries are made of a pseudoelastic alloy, however, a "pseudoelastic hinge" would be formed in lieu of the "plastic hinge". In this case, stresses in the vicinity of the angle where flexural deformations concentrate reach the pseudoelasitc stress plateau, and thus bending occurs at a relatively constant moment, yielding a relatively constant-force behavior. The "pseudoelastic hinge," unlike the "plastic hinge," is capable of recovering its original geometry upon unloading, and thus does not cease to behave as a spring. FIG. 5 shows the stress condition for a "pseudoelastic hinge" formed in a pseudoelastic element (ribbon) of rectangular cross section.

Figure 6:
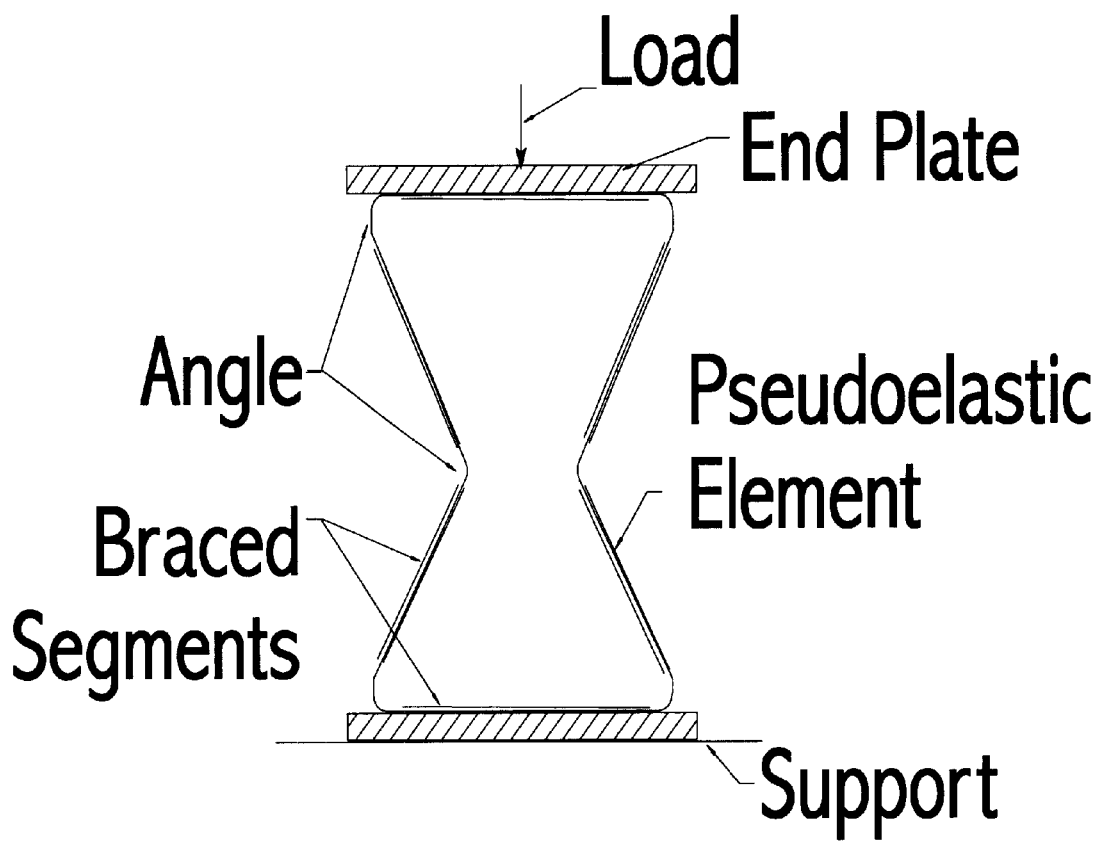
FIG. 6 shows a pseudoelastic spring braced in segments occurring outside the regions which undergo concentrated deformations.
Figure 7:
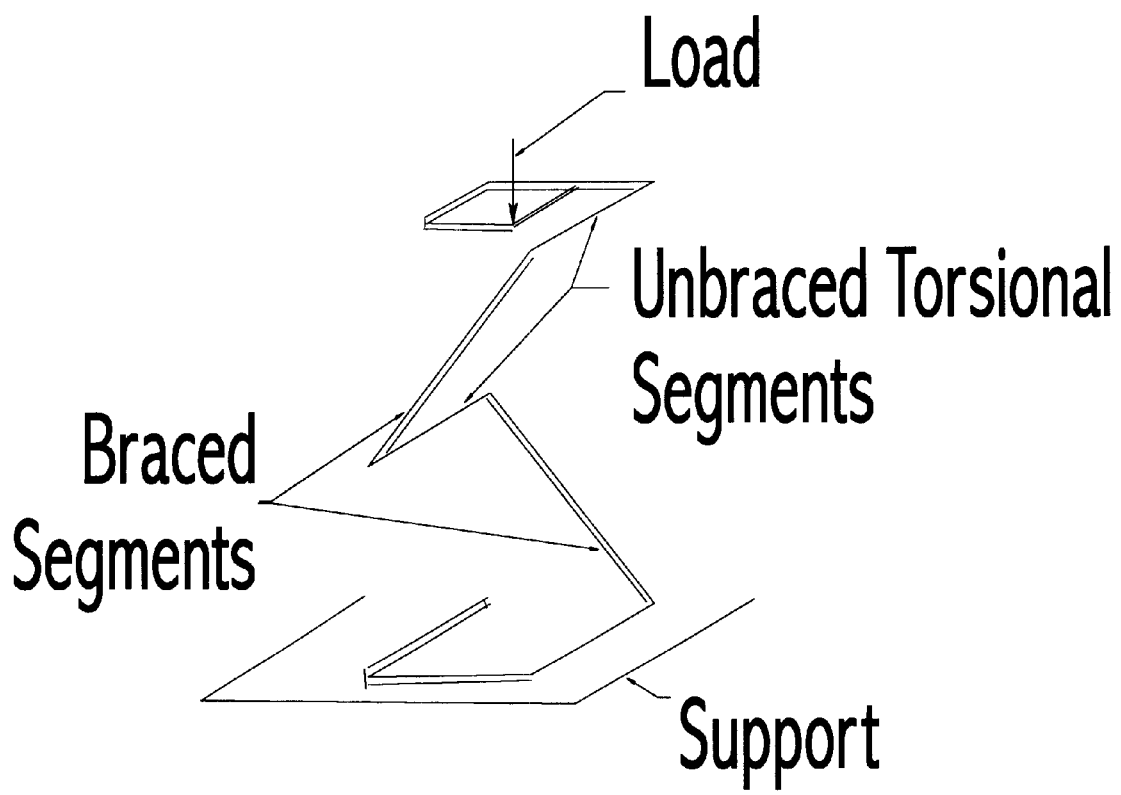
FIG. 7 shows a pseudoelastic spring with elements within which torsional deformations concentrate.

In order to further concentrate deformations and pronounce the constant-force behavior of pseudoelastic springs, one can brace the element outside regions where deformations are to concentrate. For example, FIG. 6 shows a spring element similar to that shown in FIG. 4 except that segments outside the bend regions are braced (e.g., stiffened by adhering onto them a stiffer element). Bracing increases the stiffness of segments outside the bend regions and further reduces the contribution of such segments to global deformations; therefore, deformations further concentrated within unbraced bend regions. Another example of a braced spring is shown in FIG. 7 where global deformations of the spring occur by torsional deformation which concentrate in unbraced segments; the braced elements are relatively stiff and do not significantly contribute to global deformations.

Figure 8:
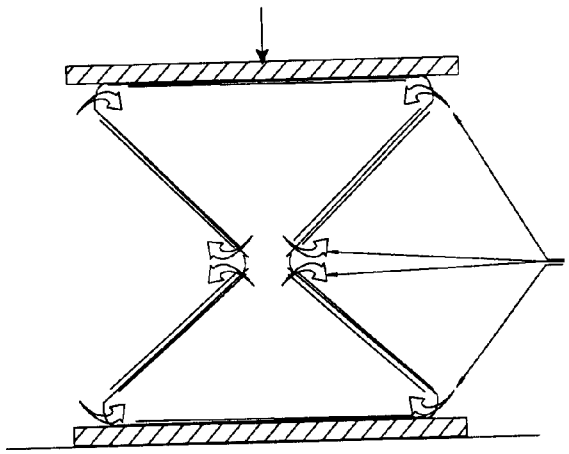
FIG. 8 shows the deformed shape of a pseudoelastic spring with pseudoelastic hinges formed within regions where deformations concentrate.
Figure 9:
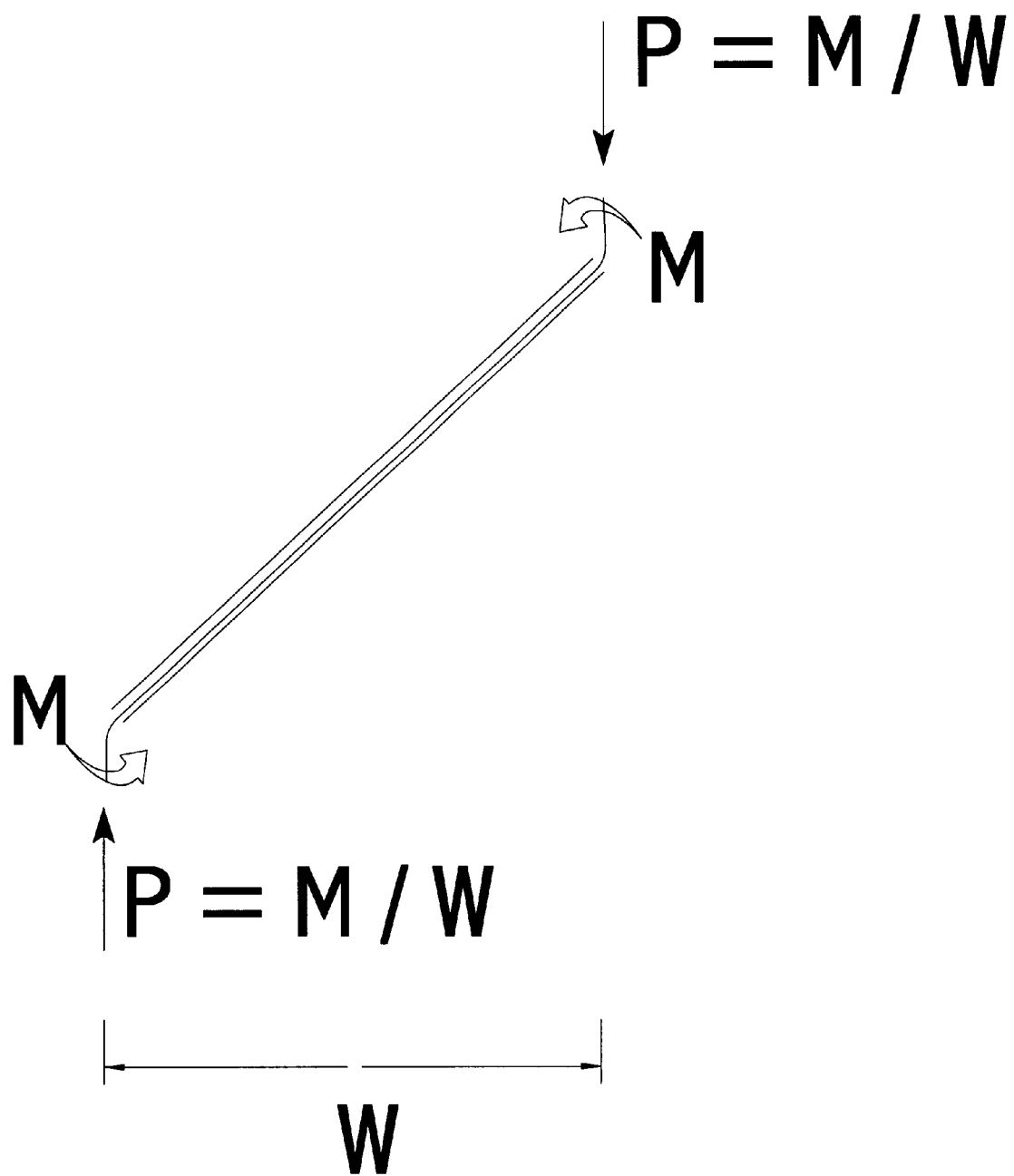
FIG. 9 shows the free body diagram of a pseudoelastic segment comprising end regions within which deformations concentrate and pseudoelastic hinges form.

One can use the above concept to produce constant-force pseudoelastic springs by shaping as-rolled ribbons (or as-drawn wires) of a pseudoelastic alloy to a geometry capable of concentrating at least one of flexural and torsional deformations within certain segments, for example the geometries of FIGS. 2 through 4, 6 and 7, during annealing so that the alloy assumes (memorizes) this double-angle geometry. Such springs, when subjected to global deformations, form "pseudoelastic hinges" within segments where deformations concentrate. Since these "pseudoelastic hinges" can undergo flexural and/or torsional deformations at a relatively constant moment, loading of said pseudoelastic spring, as shown in FIG. 8 for the spring geometry of FIG. 6, yields a constant-force behavior under increasing deformations as the alloy undergoes increasing strains on the upper stress plateau (at "pseudoelastic hinge" locations). This constant force is proportional to the constant "pseudoelastic hinge" moment and inversely proportional to the width of the spring (i.e., the lateral distance between the load and the "pseudoelastic hinge" location). FIG. 9 shows the free body diagram of one of the four elements comprising the spring shown in FIG. 8. The magnitude of load (P) given in FIG. 9 in terms of the pseudoelastic hinge bending moment (M) is derived based on equilibrium of bending moments. Unloading also occurs at a constant force as the alloy undergoes decreasing strains over the lower stress plateau (at "pseudoelastic hinge" locations).

Different apseudoelastic alloys, including groups consisting essentially of Ni. Ag, Au, Cd, In, Ga, Si, Ge, Sn, Sb, Zn, Nb, Cu, Co, Fe Mn, Pt, Al, Ti, Cr, Be, C and Tl, and combinations thereof, can be used in the invention. Different cold-working, annealing, cooling and heat treatment conditions, and different deformation time-histories influence the constitutive behavior and mechanical characteristics of pseudoelastic alloys and thus tailor the behavior of constant-force pseudoelastic springs.

INVENTION AND COMPARISON EXAMPLES

EXAMPLE 1

Figure 10:
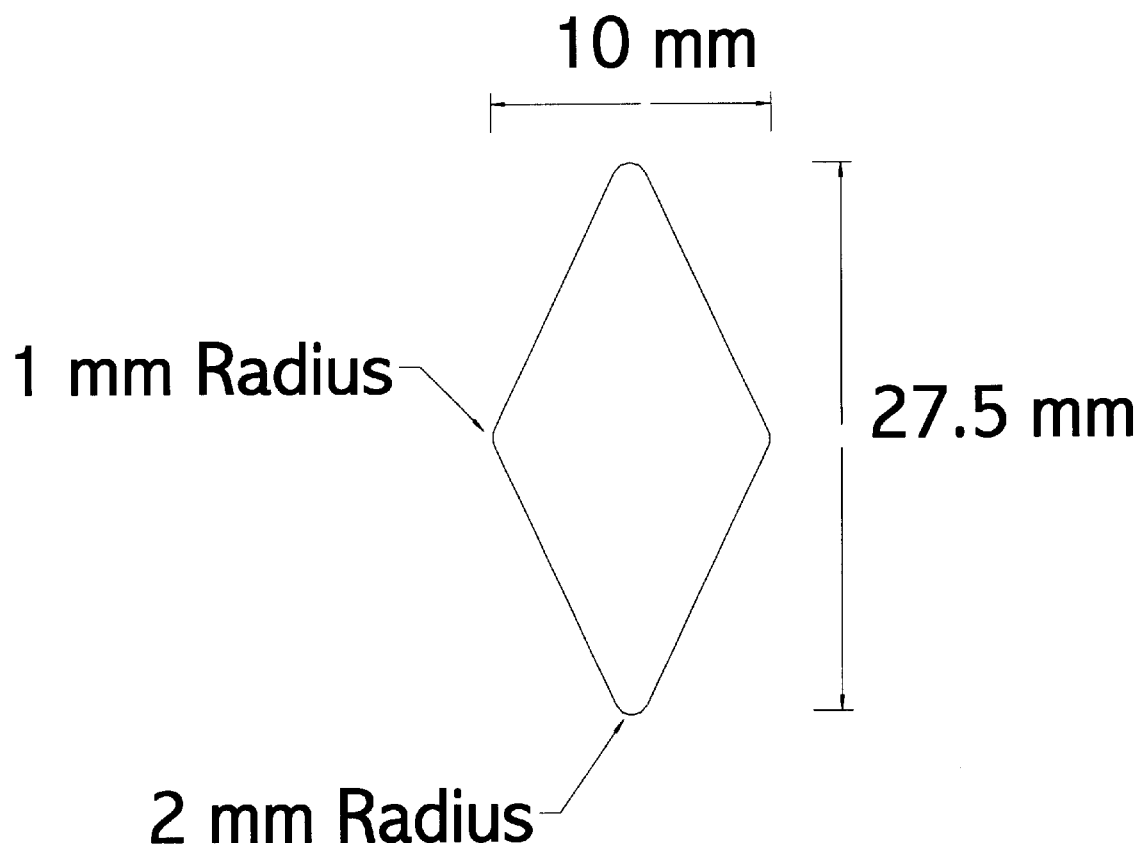
FIG. 10 shows an example pseudoelastic spring.
Figure 11:
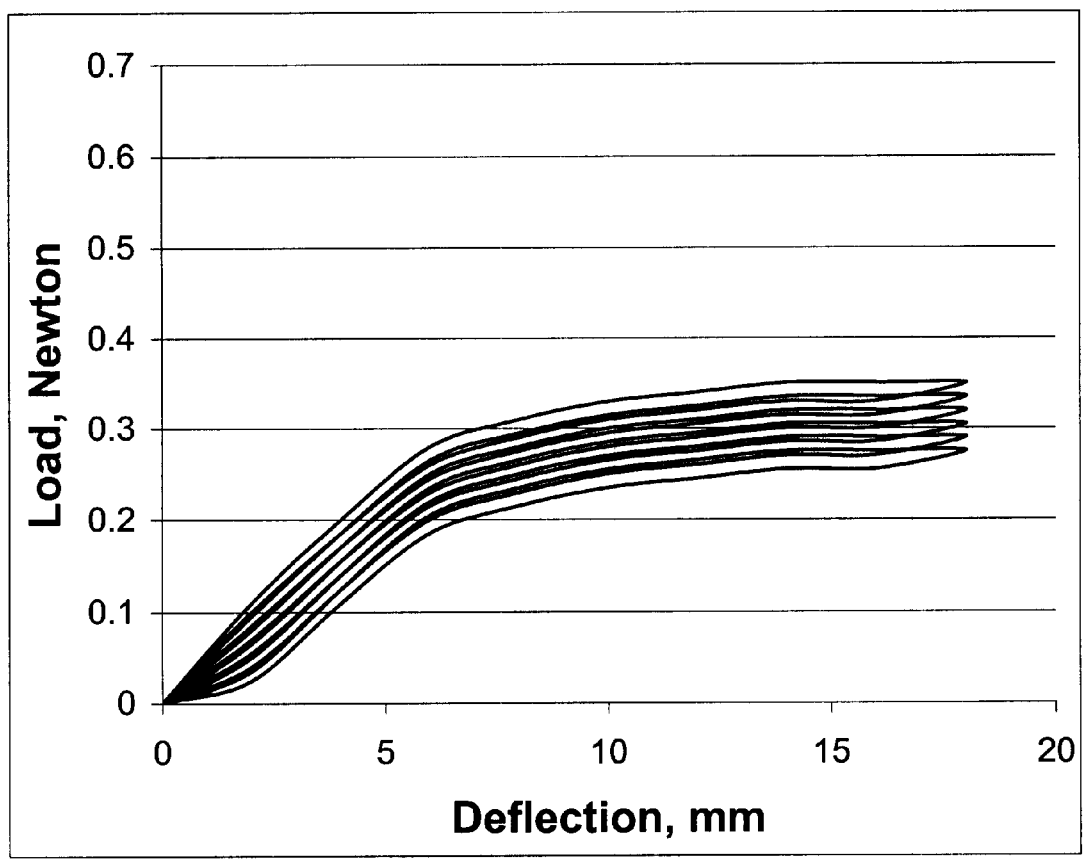
FIG. 11 shows the load-deflection behavior of the example spring of FIG. 10.

A pseudoelastic Ni—Ti alloy with 50 weight % Ni was cold-drawn into a straight ribbon geometry with 2×0.1 mm rectangular cross section. The ribbon was restrained to assume the shape shown in FIG. 10, and then annealed at 500° C. for 10 minutes and air-cooled to memorize the said shape. Repeated axial loading (see FIG. 2) and unloading of this pseudoelastic spring at test temperature of 20° C. resulted in the load-deflection relationship shown in FIG. 11. A relatively constant level of load is observed over deflections ranging from about 7 to 17 mm.

EXAMPLE 2

Figure 12:
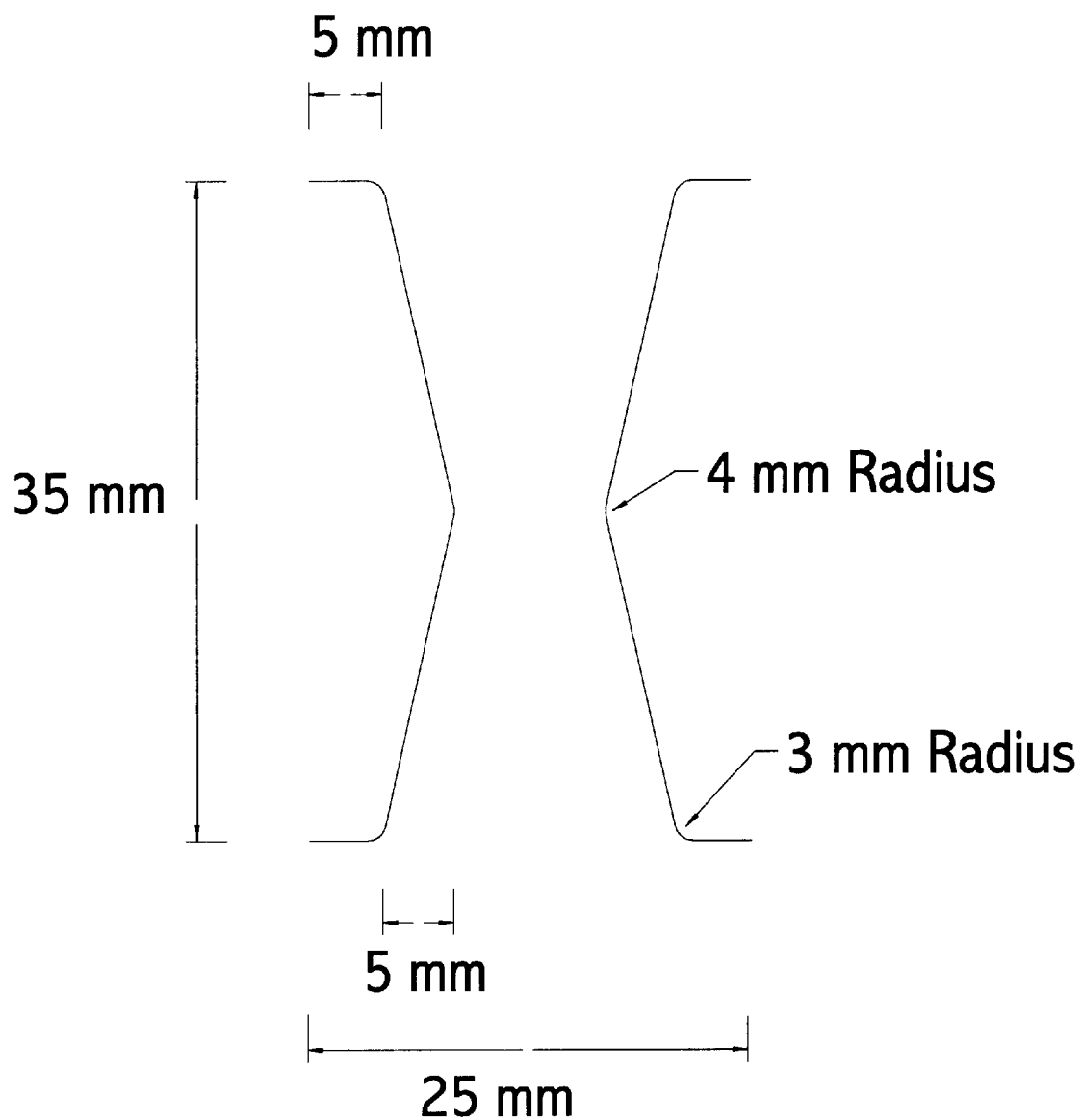
FIG. 12 shows an example pseudoelastic element.
Figure 13:
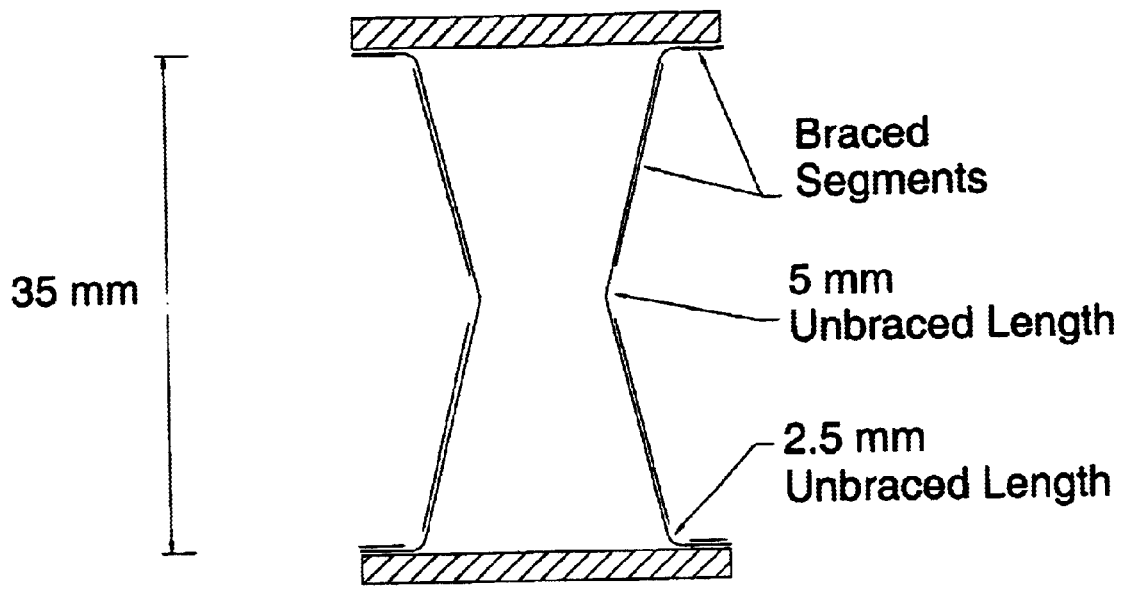
FIG. 13 shows the example pseudoelasitc element of FIG. 12 in braced and supported condition.
Figure 13:
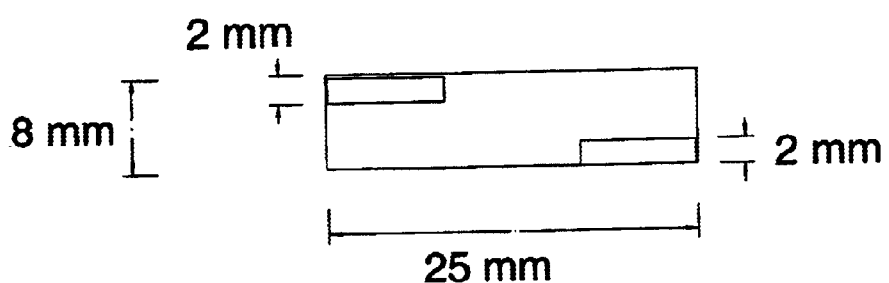
Figure 14:
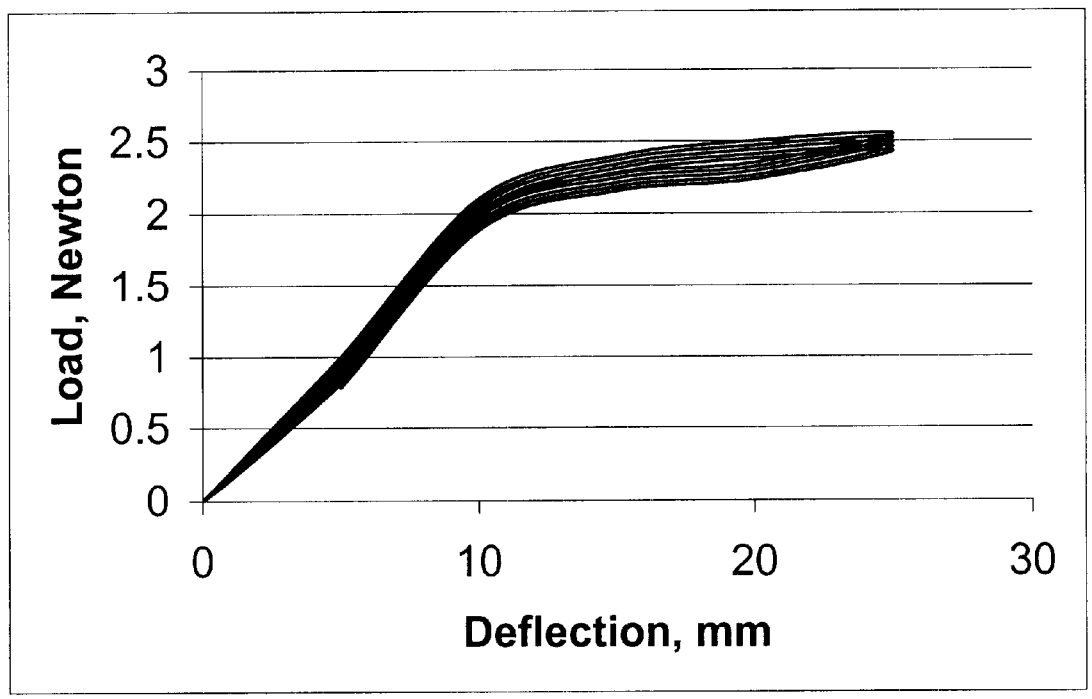
FIG. 14 shows the load-deflection behavior of the pseudoelastic spring of FIG. 13.

A pseudoelastic Ni—Ti alloy with 56.05 weight % Ni was cold-drawn into a sheet geometry with 0.15 mm thickness, and cut to a width of 2 mm. The strip was restrained to assume the shape of FIG. 12, and then annealed at 500° C. for 15 minutes and quenched in 80° C. water to memorize the shape of FIG. 12. This element was then braced and supported on end plates as shown in FIG. 13. Repeated axial loading (see FIG. 3) and unloading of this pseudoelastic spring at a test temperature of 50° C. resulted in the load-deflection relationship shown in FIG. 14. This pseudoelastic spring is observed to provide relatively constant load levels during loading (and unloading) within deflection ranges of about 10 to 25 mm.

What is claimed is:

1. A spring used in a brush holder, with said spring having force levels varying by less than 30% over more than 40% of maximum deflection capacity during loading, as said spring pushes against a brush and said spring comprising a pseudoelastic element that has a memory shape and is stiffened by a bracing that is not pseudoelastic, with at least one segment where said bracing is absent and where at least one of flexural and torsional deformations concentrate.

2. The spring used in brush holder according to claim 1, wherein the force levels of said spring vary by less than 30% over more than 40% of maximum deflection capacity during unloading.

3. The spring used in brush holder according to claim 1, wherein said pseudoealstic material is formed of elements selected from the group consisting essentially of Ni, Ag, Au, Cd, In, Ga, Si, Ge, Sn, Sb, Zn, Nb, Cu, Co, Fe, Mn, Pt, Al, Ti, Cr, Be, C and Ti, and combinations thereof.

4. The spring used in brush holder according to claim 1, wherein said pseudoelastic element has been formed and then heat treated when restrained in order to assume said memory shape.

5. The spring used in brush holder according to claim 1, wherein said force levels are applied and removed at least once for improving stability under subsequent repeated load application.

6. The spring used in brush holder according to claim 1, wherein said pseudoelastic spring is at least partly fixed against lateral deflections.

* * * * *